United States Patent [19]
Tamatani et al.

[11] Patent Number: 5,893,625
[45] Date of Patent: Apr. 13, 1999

[54] METHOD FOR MANUFACTURING LIQUID CRYSTAL DISPLAY DEVICE

[75] Inventors: Akira Tamatani; Shin Tahata; Yasuhiro Morii; Akira Tsumura; Masaya Mizunuma; Masayuki Fujii, all of Tokyo, Japan

[73] Assignee: Mitsubishi Denki Kabushiki Kaisha, Tokyo, Japan

[21] Appl. No.: 08/970,626

[22] Filed: Nov. 14, 1997

[30] Foreign Application Priority Data

Apr. 17, 1997 [JP] Japan .................... 9-100157

[51] Int. Cl.$^6$ .................... G02F 1/1341; G02F 1/1339
[52] U.S. Cl. .................... 349/189; 349/190; 349/153
[58] Field of Search .................... 349/189, 190, 349/153, 154

[56] References Cited

U.S. PATENT DOCUMENTS

| | | | |
|---|---|---|---|
| 3,990,782 | 11/1976 | Yamasaki | 350/160 |
| 4,158,485 | 6/1979 | Mueller et al. | 350/343 |
| 4,469,410 | 9/1984 | Ikesue | 350/343 |
| 5,037,185 | 8/1991 | Grupp | 359/80 |
| 5,202,778 | 4/1993 | Niki | 359/54 |
| 5,359,442 | 10/1994 | Tanaka et al. | 359/62 |
| 5,492,582 | 2/1996 | Ide et al. | 156/106 |
| 5,699,138 | 12/1997 | Watanabe et al. | 349/189 |
| 5,725,032 | 3/1998 | Oshima et al. | 141/70 |

FOREIGN PATENT DOCUMENTS

| | | |
|---|---|---|
| 55-65924 | 5/1980 | Japan . |
| 55-65925 | 5/1980 | Japan . |
| 7-333626 | 12/1995 | Japan . |

*Primary Examiner*—William L. Sikes
*Assistant Examiner*—Tarifur R. Chowdhury
*Attorney, Agent, or Firm*—Oblon, Spivak, McClelland, Maier & Neustadt, P.C.

[57] ABSTRACT

A method for manufacturing a liquid crystal display device in which two transparent insulation substrates are adhered to each other and a liquid crystal is injected into an injection area defined by a seal pattern comprising sealing material. The method comprises the steps of: starting application of the sealing material to either one of the two substrates from a position different from a cutting position of the substrate to form a liquid crystal injection hole and a liquid crystal injection area, and ending the application at a position different from the cutting position to form the seal pattern; oppositely placing the two substrates, and pressing and adhering the two substrates with the sealing material; and cutting the adhered two substrates at a predetermined position and injecting the liquid crystal from the injection hole.

3 Claims, 7 Drawing Sheets

PRIOR ART

METHOD FOR MANUFACTURING LIQUID CRYSTAL DISPLAY DEVICE

BACKGROUND OF THE INVENTION

The present invention relates to a method for manufacturing a liquid crystal display device.

FIG. 5 is an explanatory view showing a liquid crystal panel of a conventional liquid crystal display device, and FIG. 6 is a sectional view taken along the line A—A in FIG. 5. In the drawings, numeral 1 denotes a pair of opposed transparent insulation substrates composed of transparent insulation substrates 1a and 1b. Numeral 11 denotes an alignment layer formed on the transparent insulation substrates 1a and 1b; numeral 10 a seal pattern comprising a sealing material for adhering a pair of opposed transparent insulation substrates 1 and determining an injection area of liquid crystal; and numeral 3 a liquid crystal injection hole which is an opening of the seal pattern 10. Numerals 16a, 16b, . . . . 17a, 17b, . . . denote respectively display electrodes extending under the sealing material to a substrate terminal 4. The substrate terminal 4 is formed on either one 1a of a pair of transparent insulating substrates for transmitting a signal to the display electrodes 16, 17 from outside, and is separated from the pixel area through the sealing material. Numeral 5 denotes a cutting position of the transparent insulation substrate 1a, when forming a panel, on which the substrate terminal 4 is formed, and numeral 6 denotes a cutting position of the other transparent insulation substrate 1b when forming a panel.

Next, the manufacturing process of the conventional liquid crystal display device is explained.

First, an alignment layer 11 is transferred to the surfaces of two transparent insulation substrates 1a and 1b to be calcined, on at least one of which there are formed electrodes and a substrate terminal 4. Next, on either one of the transparent insulation substrates 1a and 1b, a sealing material is applied to form a seal pattern 10 having a liquid crystal injection hole 3. Next, the two transparent insulation substrates 1a and 1b are oppositely placed and pressed on each other, and the sealing material is cured to form a pair of opposed transparent insulation substrates 1. Thereafter, predetermined panel assembly steps are carried out, the adhered pair of transparent insulation substrate 1a, 1b, are cut at the substrate cutting positions 5 and 6, and liquid crystal is injected from the liquid crystal injection hole 3 to form a liquid crystal panel.

Conventionally, the seal pattern 10 is formed on the surface of either one of the pair of transparent insulation substrates 1 by screen printing method or dispenser method.

According to the screen printing method, a substrate is held under the screen plate comprising a mask having an opening of a predetermined shape and is rubbed with a roller with a sealing material being adhered to the surface of the roller over the screen plate to apply the sealing material to the substrate corresponding to the opening of the mask to form a seal pattern. The principle of this method is to use a sealing material in place of an ink and a substrate in place of paper in an ordinary mimeograph printing.

According to the dispenser method, after a sealing material into which a predetermined spacer is kneaded is filled in a syringe, the syringe is set on a dispenser, and the sealing material filled in the syringe is discharged by mainly utilizing a pneumatic pressure. The space between the substrate and the discharge part is precisely controlled, and a predetermined amount of sealing material is applied in a predetermined pattern by computer control to form a seal pattern.

As described above, with respect to the method for forming an area into which liquid crystal is injected in a liquid crystal display device and forming a seal pattern for adhering a pair of transparent insulation substrates, there have been conventionally proposed several methods, but they are not effective. For example, in a screen printing method, since the screen plate is directly brought into contact with the alignment layer formed on the transparent insulation substrate, there has been a problem to cause defective orientation due to stain or damage of the alignment layer.

Further, according to the dispenser method, due to discharge of the sealing material by pneumatic pressure, the discharge amount is not stabilized so that the shape of the seal pattern is not uniform at the application starting position and application ending position. That is to say, at the application starting position, because of the necessity to elevate the discharge pressure to a pressure level at which the sealing material can be applied, the actual application starting position is displaced from the application starting position targeted by the seal pattern. Alternatively, by allowing the dispenser for applying sealing material to stand at the application starting position for a predetermined duration of time, delicate fluctuation of pressure occurs to cause dropping of sealing material from the syringe, thereby giving large initial discharge amount to make the shape of the seal pattern at the application starting position larger than the target size. At the application ending position, due to the residual inner pressure in the syringe, there has been a problem that the application of the sealing material cannot be stopped at the application ending position.

For example, FIG. 7 is an explanatory plan view of the substrate in the case where an injection hole is formed on the substrate terminal, and FIG. 8 is a sectional view taken along the line B—B in FIG. 7. As shown in FIG. 7, when setting the application starting position 10a and the application ending position 10b of the seal pattern 10 at the liquid crystal injection hole 3, there arise the conditions where the seal pattern 10 at the liquid crystal injection hole 3 is not sufficiently formed to the substrate cutting position 6 or the sealing material projects to the substrate terminal.

In case that the seal pattern 10 for the liquid crystal injection hole 3 is not sufficiently formed to the substrate cutting position 6, as shown in FIG. 9, there is formed a gap 12 between the application starting position 10a of the seal pattern 10 and the substrate cutting position 6, so that a foam 14 might mix in the liquid crystal 13 from the gap 12 during injection of the liquid crystal 14 to cause a defective display of liquid crystal display device.

Further, when the sealing material projects to the substrate terminal 4, the cut piece 15 of the substrate adheres to the sealing material to make it impossible to remove the cut piece 15.

The present invention has been made to solve the problems as described above, and its object is to form a seal pattern capable of preventing defective injection of liquid crystal caused by inclusion of foam during injection of liquid crystal or defective cutting of substrate in the process of forming a liquid crystal display panel.

SUMMARY OF THE INVENTION

In accordance with the present invention, there is provided a method for manufacturing a liquid crystal display device in which two transparent insulation substrates on at least one of which an electrode is formed are adhered to each other in an opposed arrangement and a liquid crystal to be held between two transparent insulation substrates is injected into an injection area defined by a seal pattern comprising sealing material, the method comprising the steps of:

starting application of the sealing material to either one of the two transparent insulation substrates from a position different from a cutting position of the transparent insulation substrate to form a liquid crystal injection hole to be provided on the cutting position of the transparent insulation substrate and a liquid crystal injection area, and ending the application at a position different from the cutting position of the transparent insulation substrate to form the seal pattern comprising the sealing material;

oppositely placing the two transparent insulation substrates, and pressing and adhering the two transparent insulation substrates with the sealing material; and cutting the adhered two transparent insulation substrates at a predetermined position and injecting the liquid crystal from the injection hole of the seal pattern.

The sealing material application starting position and application ending position are preferably provided on the display area side of the cutting position of the transparent insulation substrate.

Further, in accordance with the present invention, there is provided a method of manufacturing a liquid crystal display device in which two transparent insulation substrates on at least one of which an electrode is formed are adhered to each other in an opposed arrangement and a liquid crystal to be held between two transparent insulation substrates is injected into an injection area defined by a seal pattern comprising sealing material, the method comprising the steps of:

forming a dot pattern with the sealing material on a liquid crystal injection hole to be provided at a cutting position of either one of the two transparent insulation substrates;

forming a seal pattern by providing sealing material application starting position and application ending position for forming a liquid crystal injection area on positions distant from the dot pattern by a predetermined distance;

oppositely placing the two transparent insulation substrates, and pressing and adhering the two transparent insulation substrates with the sealing material; and cutting the adhered two transparent insulation substrates at a predetermined position and injecting the liquid crystal from the injection hole of the seal pattern, wherein the dot pattern comprising the sealing material and the sealing material at the application starting position and application ending position in the seal pattern are connected with each other at the time of pressing the two transparent insulation substrates.

DETAILED DESCRIPTION

Embodiment 1

Figure 1:
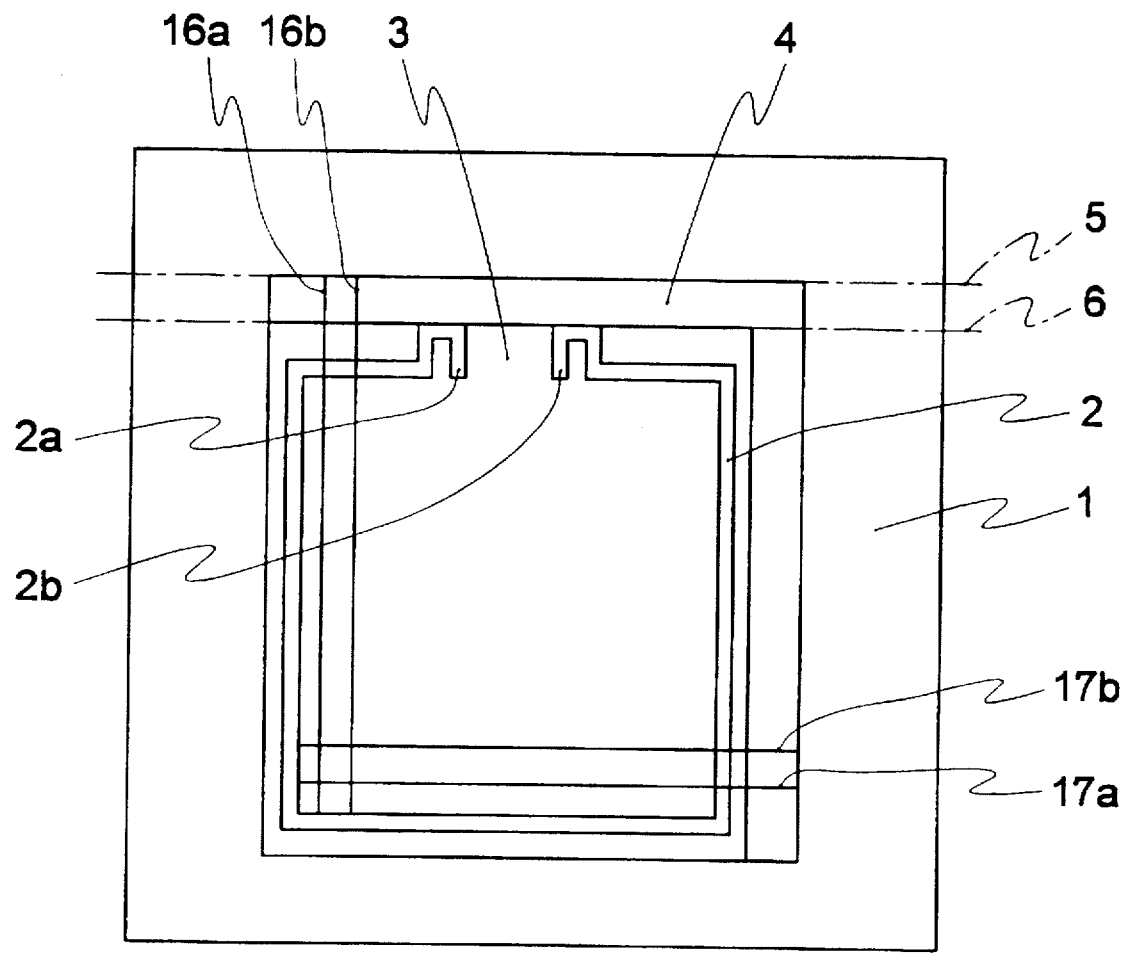
FIG. 1 is a plan view of a seal pattern of a liquid crystal display device showing Embodiment 1 of the present invention.
Figure 6:
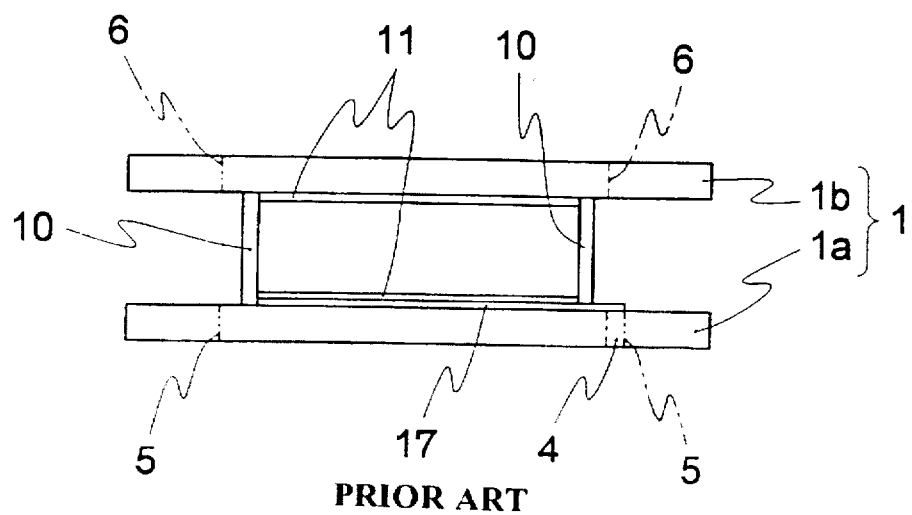
FIG. 6 is a sectional view of a conventional liquid crystal display device.
Figure 7:
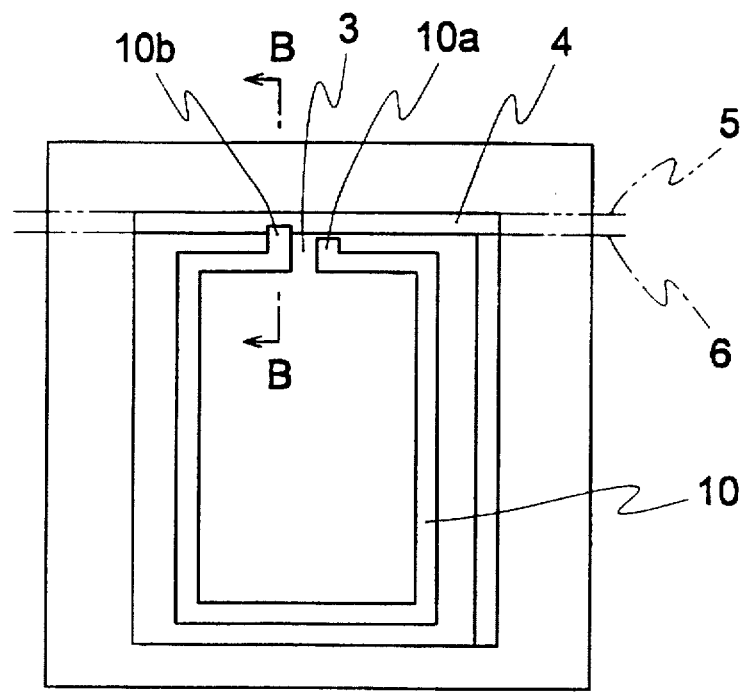
FIG. 7 is an explanatory plan view of a conventional liquid crystal display device for illustrating the conventional problems.
Figure 8:
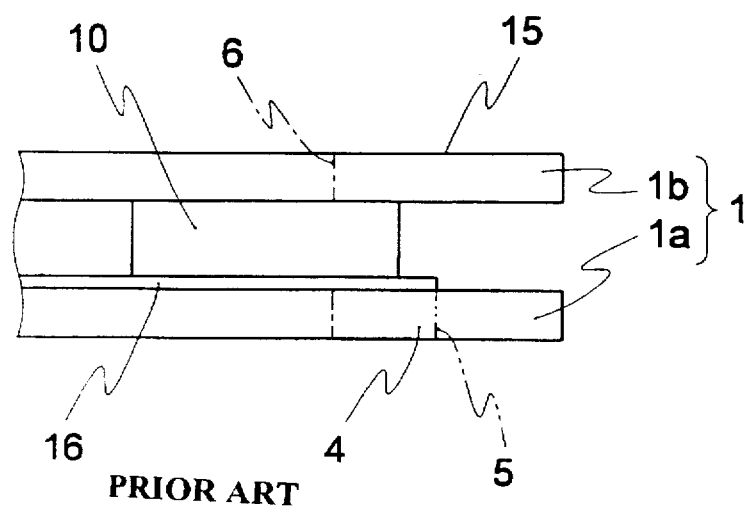
FIG. 8 is a sectional view of a conventional liquid crystal display device for illustrating the conventional problems.
Figure 9:
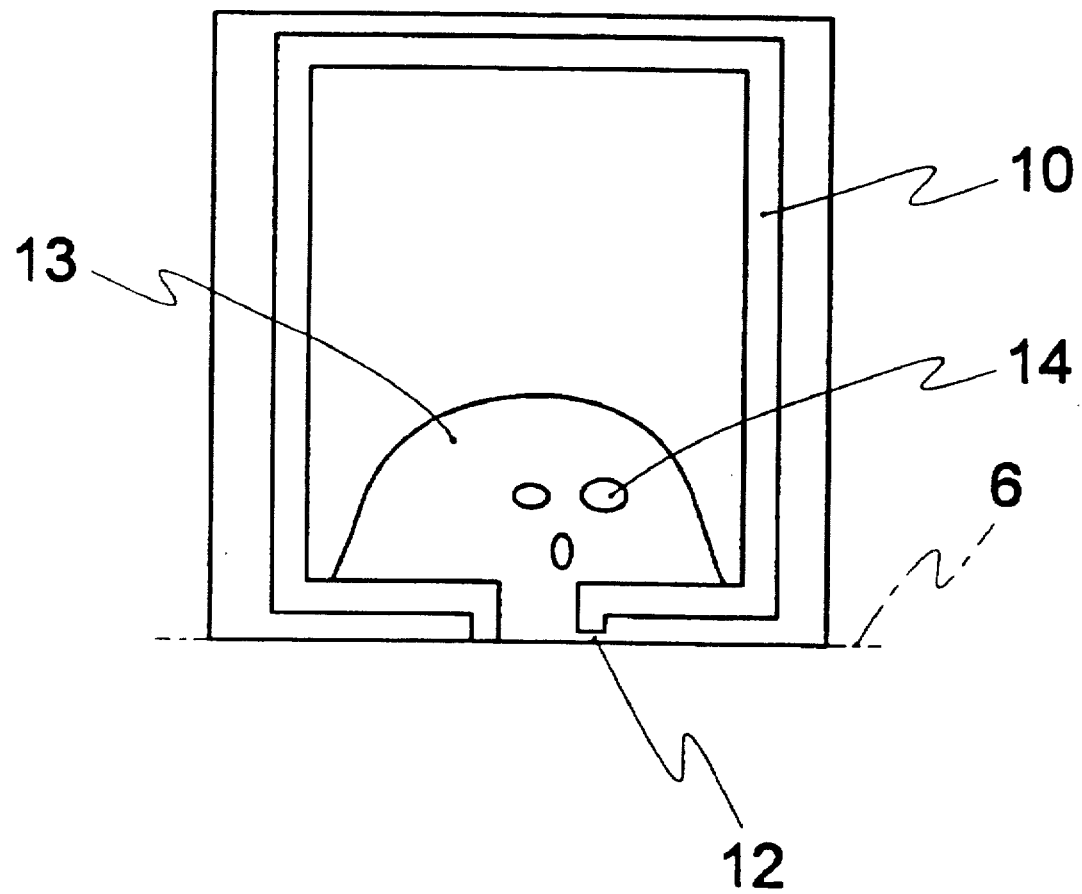
FIG. 9 is a plan view of a conventional liquid crystal display device for illustrating the conventional problems.

Hereinafter, a method of manufacturing a liquid crystal display device according to an embodiment of the present invention will be explained based on the drawings. FIG. 1 is a plan view of a seal pattern of a liquid crystal display device showing Embodiment 1 of the present invention. In the figure, numeral 1 denotes a pair of opposed transparent insulation substrates (refer to FIG. 6); numeral 2 a seal pattern comprising a sealing material for adhering a pair of opposed transparent insulation substrates 1 and determining an injection area of liquid crystal; numeral 2a a sealing material application starting position for forming a seal pattern; numeral 2b an application ending position; and numeral 3 a liquid crystal injection hole which is an opening of the seal pattern 2. Numerals 16a, 16b, . . . , 17a, 17b, denote respectively display electrodes extending under the sealing material to a substrate terminal 4. The substrate terminal 4 is formed on either one 1a of a pair of transparent insulation substrates for transmitting a signal to the display electrodes 16, 17 from outside, and is separated from a pixel area through the sealing material. Numeral 5 denotes a cutting position of the transparent insulation substrate 1a when forming a panel, on which the substrate terminal 4 is formed, and numeral 6 denotes a cutting position of the other transparent insulation substrate 1b when forming a panel.

Next, the manufacturing process of the liquid crystal display device according to the present embodiment is explained.

First, on either one of the two transparent insulation substrates 1a and 1b on at least one of which the display electrodes 16, 17 and substrate terminal 4 are formed, a sealing material is applied from the application starting position 2a to the application ending position 2b based on the previously prepared computer pattern data for dispenser control to form a seal pattern 2 having a liquid crystal injection hole 3. At this time, the sealing material application starting position 2a and application ending position 2b are provided outside the display area and inside the position where the seal pattern 9 contacts the cutting position 6, at the time of panel formation, of the transparent insulation substrate 1b on which no substrate terminal 4 is formed, which would become a liquid crystal injection hole 3.

Figure 2:
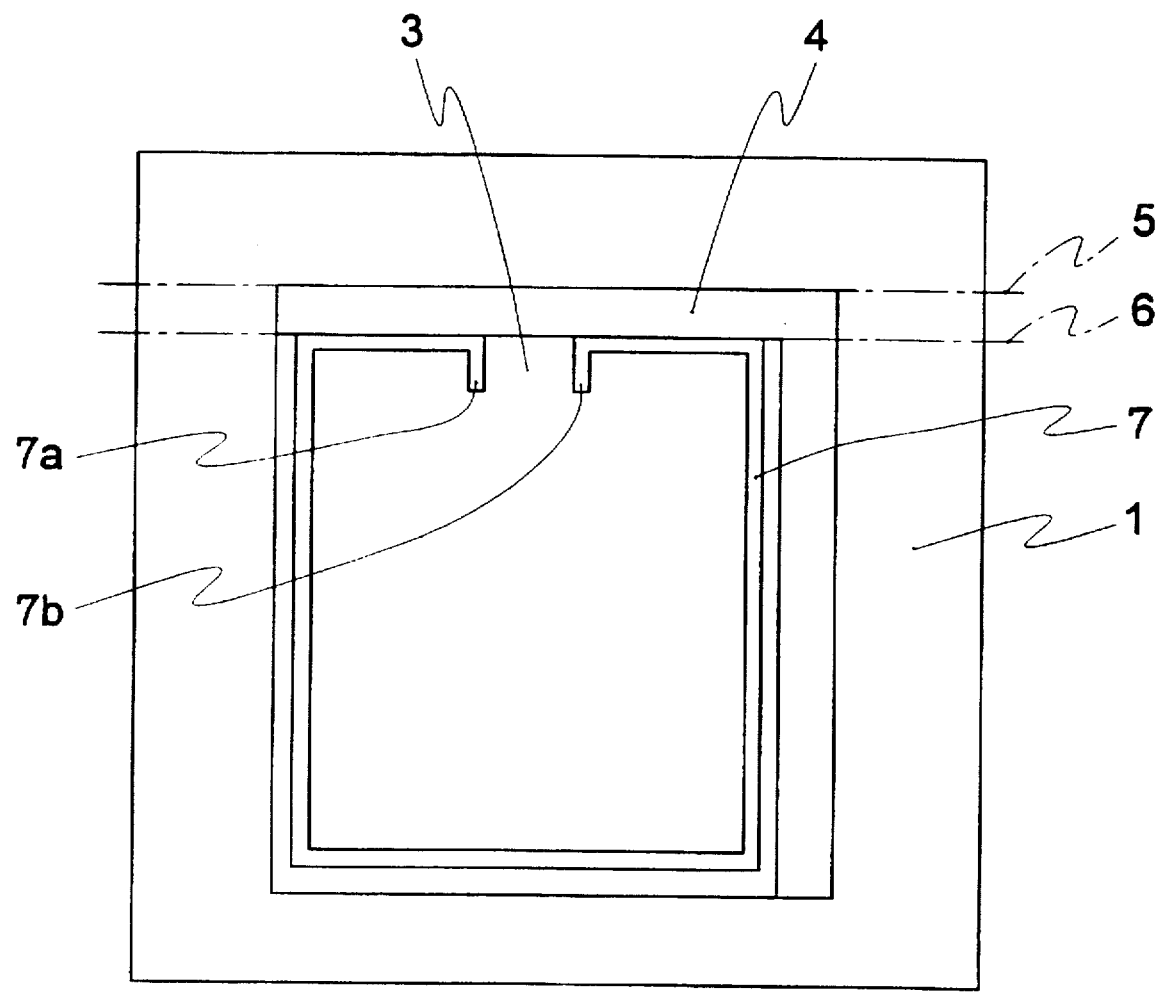
FIG. 2 is a plan view of a seal pattern of a liquid crystal display device showing Embodiment 1 of the present invention.

According to the seal pattern 2 shown in FIG. 1, the liquid crystal injection hole 3 shows a convex shape against the liquid crystal injection area, and the shape of the seal pattern 2 for the liquid crystal injection hole 3 is of a shape which extends from the application starting position 2a or application ending position 2b inside the substrate to the outside substrate cutting position 6 and again returns to the inside of the substrate. On the other hand, as shown in FIG. 2, in the case where the liquid crystal injection area is formed along the substrate cutting position, the seal pattern 7 for the liquid crystal injection hole 3 has such a shape as to extend from the application starting position 7a or application ending position 7b inside the substrate to the substrate cutting position 6.

Next, the two transparent insulation substrates 1a and 1b are oppositely placed and pressed on each other, and the sealing material is cured to form a pair of opposed transparent insulation substrates 1. Thereafter, predetermined panel assembly steps are carried out, and the adhered pair of transparent insulation substrates 1 are cut at the substrate cutting positions 5 and 6. At this time, because of no projection of the sealing material to the substrate terminal 4, the cutting of substrate and separation of the cut substrate can be easily performed. Furthermore, since the seal pattern 2 for the liquid crystal injection hole 3 is formed up to the substrate cutting position 6, no inclusion of foam is observed in injecting the liquid crystal.

According to the present invention, by providing the application starting position 2a and application ending position 2b of the sealing material which constitutes the seal pattern 2 inside the position where the seal pattern 2 contacts the substrate cutting position 6 at the time of panel formation, which would become the liquid crystal injection hole 3, no projection of the sealing material to the substrate terminal 4 occurs, so that the cutting of substrate and separation of the cut substrate can be easily performed. Moreover, since the seal pattern 2 for the liquid crystal injection hole 3 is formed up to the substrate cutting position 6, no inclusion of foam can be seen in injecting the liquid crystal.

Embodiment 2

Figure 3A:
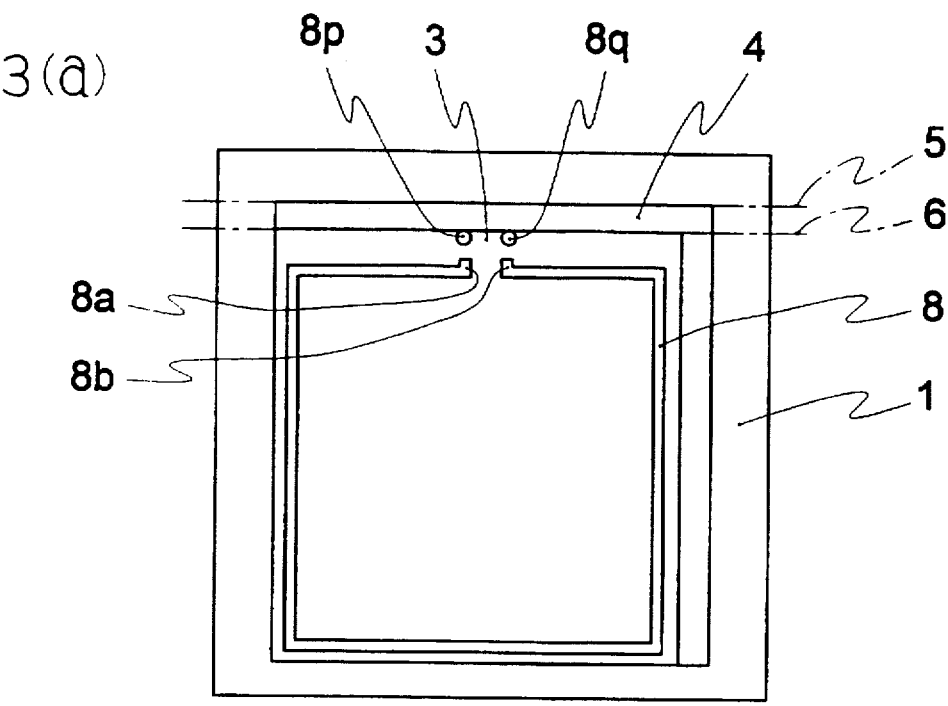
FIG. 3 is a plan view of a seal pattern of a liquid crystal display device showing Embodiment 2 of the present invention.

FIG. 3 is a plan view of a seal pattern of a liquid crystal display device showing Embodiment 2 of the present invention. In the figure, numeral 8 denotes a seal pattern comprising a sealing material for adhering a pair of opposed transparent insulation substrates 1 and determining an injection area of liquid crystal; numeral 8a a sealing material application starting position for forming a seal pattern 8; numeral 8b an application ending position; and numerals 8p and 8q point patterns made of sealing material to be formed on the portions on which the liquid crystal injection hole 3 is to be provided. Other constitutions are the same as those of Embodiment 1, so explanation thereof are omitted here.

Next, the manufacturing process of the liquid crystal display device according to the present embodiment is explained.

First, on either one of the two transparent insulation substrates 1a and 1b on at least one of which the electrodes and substrate terminal 4 are formed, a sealing material is applied based on the previously prepared computer pattern data for dispenser control to form point patterns 8p and 8q on a portion to be a liquid crystal injection hole 3. Thereafter, in the same manner, using the computer controlled dispenser, the sealing material is applied from the application starting position 8a which is distant by about 2 mm from the point pattern 8p to the substrate inside, to the application ending position 8b which is distant by about 2 mm from the point pattern 8q to the substrate inside (FIG. 3(a)).

Figure 3B:
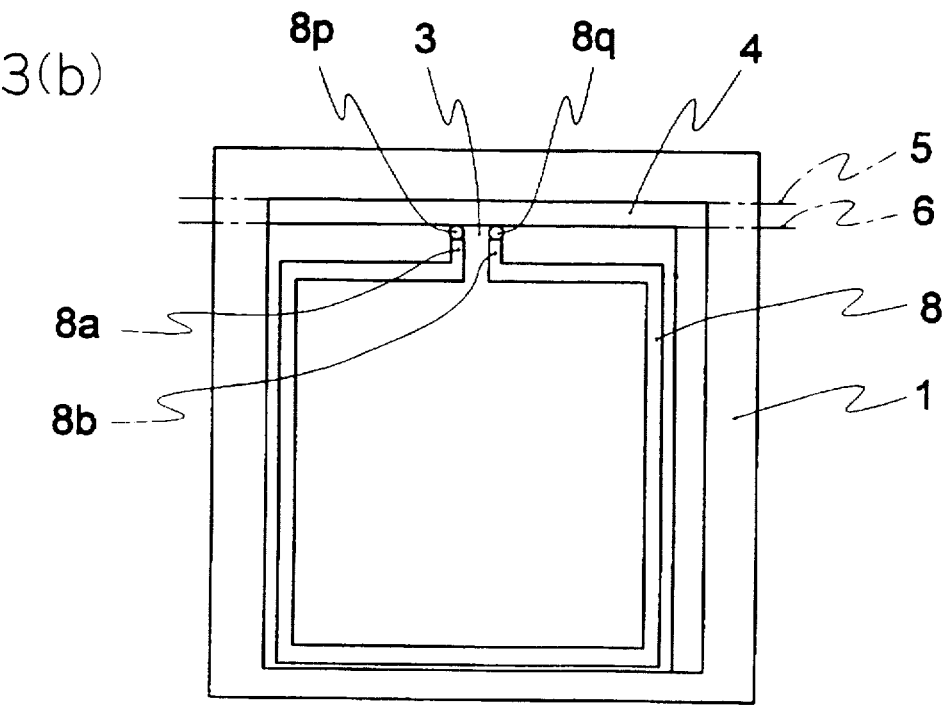

Next, the two transparent insulation substrates 1a and 1b are oppositely placed and pressed on each other, and the sealing material applied to the substrate is pressed to spread as shown in FIG. 3(b)), thereby the point pattern 8p and the sealing material at the application starting position 8a, and the point pattern 8q and the sealing material at the application ending position 8b are connected respectively with each other to form a continued seal pattern 8 having a liquid crystal injection hole 3. Then, the sealing material is cured to form a pair of opposed transparent insulation substrates 1.

In this embodiment, the application starting position 8a and the application ending position 8b of the seal pattern 8 are set to be the positions about 2 mm distant from the point patterns 8p and 8q, respectively, but they might be optional positions provided that the sealing material is pressed during pressing of the substrate to permit connection between the point pattern 8p and the application starting position 8a, and between the point pattern 8q and the application ending position 8b.

Thereafter, predetermined panel assembly steps are carried out, and the adhered pair of transparent insulation substrates 1 are cut at the substrate cutting positions 5 and 6. At this time, because of no projection of the sealing material to the substrate terminal 4, the cutting of substrate and separation of the cut substrate can be easily performed. Furthermore, since the seal pattern 8 for the liquid crystal injection hole 3 is formed up to the substrate cutting position 6, no inclusion of foam is observed in injecting the liquid crystal.

According to the present invention, by forming the point patterns 8p and 8q which permit stabilized application in position and shape to the liquid crystal injection hole 3, and by providing the sealing material application starting position 8a and application ending position 8b which constitute the seal pattern 8 on the positions distant from the point patterns 8p and 8q, by a predetermined distance to the inside of substrate respectively, no projection of the sealing material to the substrate terminal 4 occurs, so that the cutting of the substrate and separation of the cut substrate can be easily performed. Moreover, since the seal pattern 8 for the liquid crystal injection hole 3 is formed up to the substrate cutting position 6, no inclusion of foam can be seen in injecting the liquid crystal.

Embodiment 3

Figure 4A:
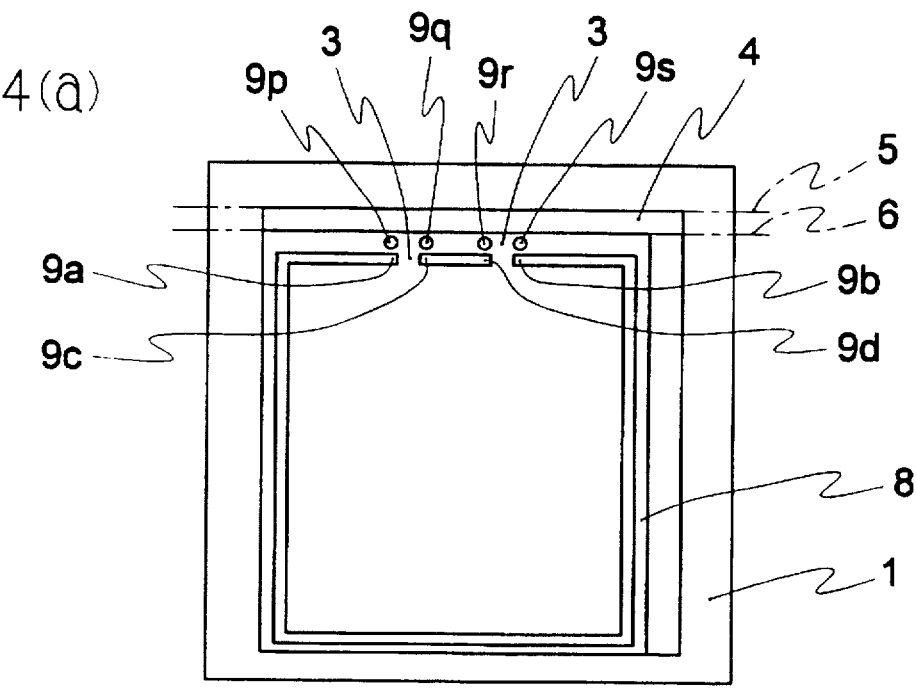
FIG. 4 is a plan view of a seal pattern of a liquid crystal display device showing Embodiment 3 of the present invention.

FIG. 4 is a plan view of a seal pattern of a liquid crystal display device showing Embodiment 3 of the present invention. In the figure, numeral 9 denotes a seal pattern comprising a sealing material for adhering a pair of opposed transparent insulation substrates 1 and determining an injection area of liquid crystal, and having two openings to form liquid crystal injection holes 3. Numerals 9a and 9c denote sealing material application starting positions for forming the seal pattern 9; 9b and 9d application ending positions; and 9p, 9q, 9r and 9s point patterns made of sealing material to be formed on the portions on which the liquid crystal injection hole 3 is provided. The liquid crystal injection holes are provided at two spots by the point patterns 9p and 9q, and 9r and 9s. Other constitutions are the same as those of Embodiment 1, so explanation thereof are omitted here.

Next, the manufacturing process of the liquid crystal display device according to the present embodiment is explained.

First, on either one of the two transparent insulation substrates 1a and 1b on at least one of which the electrodes and substrate terminal 4 are formed, a sealing material is applied based on the previously prepared computer pattern data for dispenser control to form point patterns 9p, 9q, 9r and 9s on the liquid crystal injection hole 3. Thereafter, in the same manner, using the computer controlled dispenser, the sealing material is applied from the application starting position 9a which is distant by about 1 mm from the point pattern 9p to the substrate inside, to the application ending position 9b which is distant by about 1 mm from the point pattern 9q to the substrate inside. Further, the sealing material is applied from the application starting position 9c which is distant by about 1 mm from the point pattern 9q to the substrate inside, to the application ending position 9d which is distant by about 1 mm from the point pattern 9r to the substrate inside (FIG. 4(a)).

Figure 4B:
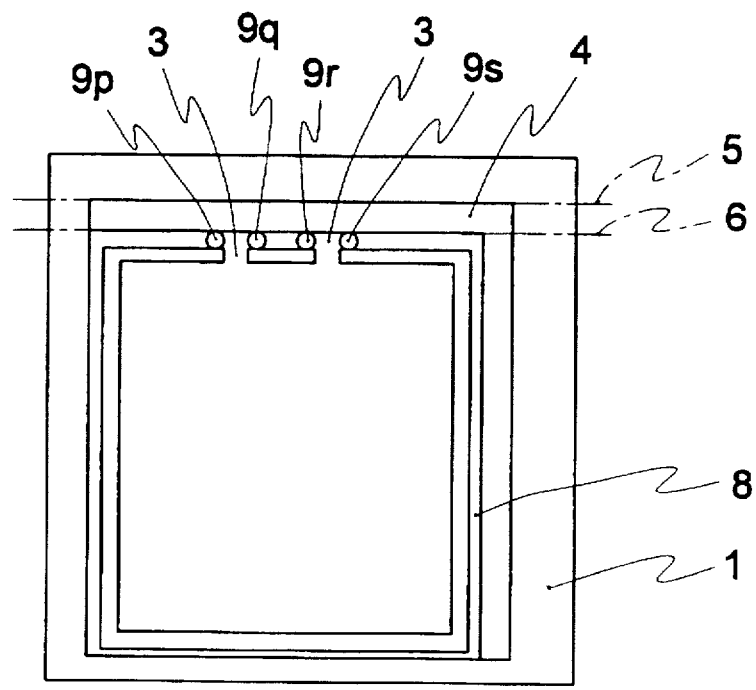
Figure 5:
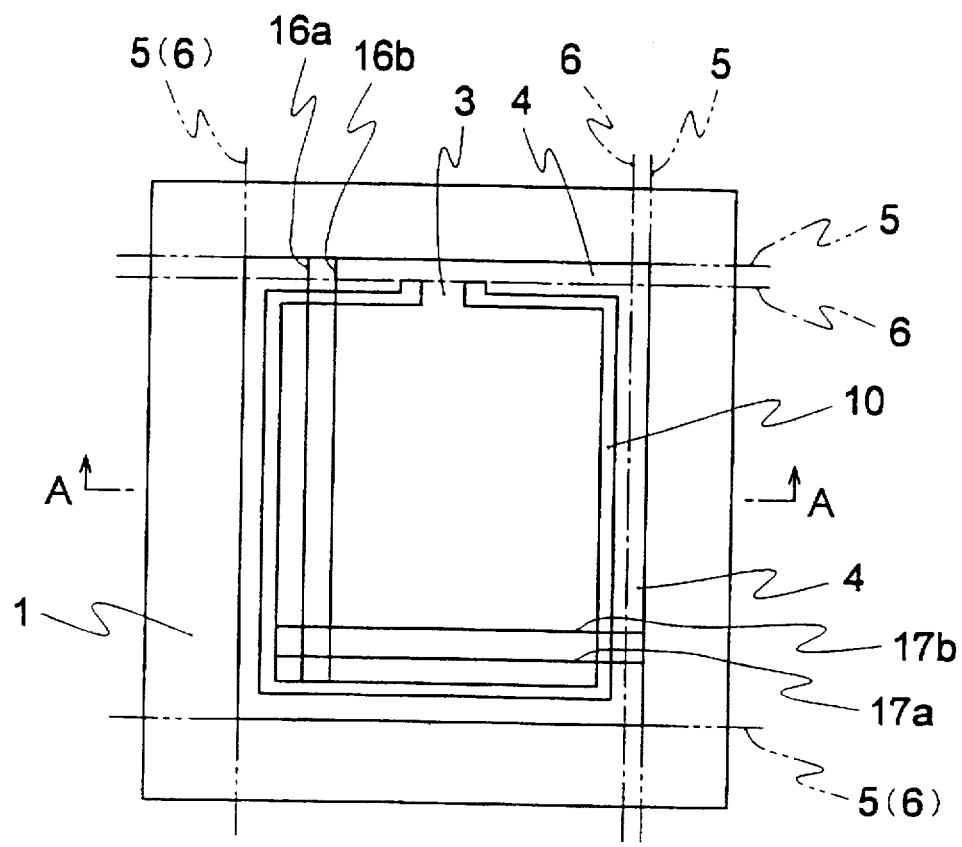
FIG. 5 is an explanatory plan view of a conventional liquid crystal display device.

Next, the two transparent insulation substrates 1a and 1b are oppositely placed and pressed on each other, and the sealing material applied to the substrate is pressed to spread as shown in FIG. 4(b), thereby the point pattern 9p and the sealing material at the application starting position 9a, the point pattern 9q and the sealing material at the application starting position 9c, the point pattern 9r and the sealing material at the application ending position 9d, and the point pattern 9s and the sealing material at the application ending position 9b are connected with each other respectively to form a continued seal pattern 9 having the two liquid crystal injection holes 3. Then, the sealing material is cured to form a pair of opposed transparent insulation substrates 1.

In this embodiment, the application starting positions 9a and 9c, and the application ending positions 9b and 9d of the seal pattern 9 are set to be the positions about 1 mm distant from the point patterns 9p, 9q, 9r and 9s, respectively, but they might be optional positions provided that the sealing material is pressed during pressing of the substrate to permit connection between the point patterns 9p, 9q, 9r and 9s and the corresponding application starting position 9a and 9c, and the application ending positions 9b and 9d.

Thereafter, predetermined panel assembly steps are carried out, and the adhered pair of transparent insulation substrates 1 are cut at the substrate cutting positions 5 and 6. At this time, because of no projection of the sealing material to the substrate terminal 4, the cutting of substrate and separation of the cut substrate can be easily performed. Furthermore, since the seal pattern 9 for the liquid crystal injection hole 3 is formed up to the substrate cutting position 6, no inclusion of foam is observed in injecting the liquid crystal.

According to the present invention, by forming the point patterns 9p, 9q, 9r and 9s which permit stabilized application in position and shape to the liquid crystal injection hole 3, and by providing the sealing material application starting positions 9a and 9c and application ending positions 9b and 9d which constitute the seal pattern 9 on the positions distant by a predetermined distance in the inside of substrate from the point patterns 9p, 9q, 9r and 9s, respectively, no projection of the sealing material to the substrate terminal 4 occurs, so that the cutting of the substrate and separation of the cut substrate can be easily performed. Moreover, since the seal pattern 9 for the liquid crystal injection hole 3 is formed up to the substrate cutting position 6, no inclusion of foam can be seen in injectioning the liquid crystal.

As described above, according to the present invention, (1) by providing the sealing material application starting position and application ending position which constitute the seal pattern inside the position where the seal pattern contacts the substrate cutting position at the time of panel formation, which would become the liquid crystal injection hole, or (2) by forming the point patterns which permit stabilized application in position and shape to the liquid crystal injection hole, and providing the sealing material application starting position and application ending position which constitute the seal pattern on the positions distant by a predetermined distance in the inside of substrate from the point patterns, no projection of the sealing material to the substrate terminal occurs, and the seal pattern for the liquid crystal injection hole is formed up to the substrate cutting position. Accordingly, the panel can be easily cut and separated to the desired shape, defect of display by inclusion of foam at the time of injection of liquid crystal can be prevented, and quality and yield in production of liquid crystal display device can be improved.

What is claimed is:

1. A method for manufacturing a liquid crystal display device in which two transparent insulation substrates on at least one of which an electrode is formed are adhered to each other in an opposed arrangement and a liquid crystal to be held between two transparent insulation substrates is injected into an injection area defined by a seal pattern comprising sealing material, the method comprising the steps of:

starting application of the sealing material to either one of the two transparent insulation substrates from a position different from a cutting position of the transparent insulation substrate to form a liquid crystal injection hole to be provided on the cutting position of the transparent insulation substrate and a liquid crystal injection area, and ending the application at a position different from the cutting position of the transparent insulation substrate to form the seal pattern comprising the sealing material;

oppositely placing the two transparent insulation substrates, and pressing and adhering the two transparent insulation substrates with the sealing material; and cutting the adhered two transparent insulation substrates at a predetermined position and injecting the liquid crystal from the injection hole of the seal pattern.

2. The method of claim 1, wherein the sealing material application starting position and application ending position are provided on the display area side of the cutting position of the transparent insulation substrate.

3. A method of manufacturing a liquid crystal display device in which two transparent insulation substrates on at least one of which an electrode is formed are adhered to each other in an opposed arrangement and a liquid crystal to be held between two transparent insulation substrates is injected into an injection area defined by a seal pattern comprising sealing material, the method comprising the steps of:

forming a dot pattern with the sealing material on a liquid crystal injection hole to be provided at a cutting position of either one of the two transparent insulation substrates;

forming a seal pattern by providing sealing material application starting position and application ending position for forming a liquid crystal injection area on positions distant from the dot pattern by a predetermined distance;

oppositely placing the two transparent insulation substrates, and pressing and adhering the two transparent insulation substrates with the sealing material; and cutting the adhered two transparent insulation substrates at a predetermined position and injecting the liquid crystal from the injection hole of the seal pattern, wherein the dot pattern comprising the sealing material and the sealing material at the application starting position and application ending position in the seal pattern are connected with each other at the time of pressing the two transparent insulation substrates.

* * * * *